United States Patent
Leonard et al.

(10) Patent No.: US 7,793,289 B1
(45) Date of Patent: Sep. 7, 2010

(54) SYSTEM ACCOUNTING FOR OPERATING SYSTEM PARTITIONS

(75) Inventors: Ozgur C. Leonard, San Mateo, CA (US); Andrew G. Tucker, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1919 days.

(21) Appl. No.: 10/762,067

(22) Filed: Jan. 20, 2004

Related U.S. Application Data

(60) Provisional application No. 60/469,558, filed on May 9, 2003.

(51) Int. Cl.
G06F 9/46 (2006.01)

(52) U.S. Cl. .................................................... 718/100

(58) Field of Classification Search ................... 705/51; 709/104; 717/100
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,345,590 A | 9/1994 | Ault et al. |
| 5,437,032 A | 7/1995 | Wolf et al. |
| 5,590,314 A | 12/1996 | Ueno et al. |
| 5,682,530 A | 10/1997 | Shimamura |
| 5,784,706 A | 7/1998 | Oberlin et al. |
| 5,841,869 A | 11/1998 | Merkling et al. |
| 5,845,116 A | 12/1998 | Saito et al. |
| 5,925,102 A | 7/1999 | Eilert et al. |
| 5,963,911 A | 10/1999 | Walker et al. |
| 5,983,270 A | 11/1999 | Abraham et al. |

(Continued)

FOREIGN PATENT DOCUMENTS

| | | |
|---|---|---|
| EP | 389151 A2 | 9/1990 |
| EP | 1043658 A1 | 10/2000 |
| EP | 1 253 516 A2 | 10/2002 |
| EP | 1253516 A2 | 10/2002 |
| EP | 1228038 A2 | 2/2003 |
| EP | 1300766 A | 4/2003 |
| WO | WO 00/45262 A2 | 8/2000 |

OTHER PUBLICATIONS

Poul-Henning Kamp, et al., "Jails: Confining the omnipotent root", 2nd Intl System Administration and Networking Conference Proceedings "SANE 2000", May 22-25, 2000, Maastricht, The Netherlands, pp. 1-11.

(Continued)

*Primary Examiner*—Meng-Ai An
*Assistant Examiner*—Eric C Wai
(74) *Attorney, Agent, or Firm*—Osha • Liang LLP

(57) ABSTRACT

A mechanism is disclosed for system accounting in an operating system environment that has been partitioned into a global zone and one or more non-global zones. Each zone is associated with one or more processes that execute in association with that zone. Each zone contains a separate system accounting log file. When a process terminates, the process invokes an exit function implemented by a kernel that controls all of the zones. In response, the kernel determines in which zone the process executed. The kernel adds, to the system accounting log file of the zone in which the process executed, a first record that indicates accounting information for the process. The kernel also may add a second record to a global system accounting log file. The first record may contain details specified by a non-global zone's settings, while the second record may contain different details specified by the global zone's settings.

36 Claims, 6 Drawing Sheets

U.S. PATENT DOCUMENTS

| | | | |
|---|---|---|---|
| 6,064,811 | A | 5/2000 | Spilo et al. |
| 6,074,427 | A | 6/2000 | Fought et al. |
| 6,075,938 | A | 6/2000 | Bugnion et al. |
| 6,247,109 | B1 | 6/2001 | Kleinsorge et al. |
| 6,279,046 | B1 | 8/2001 | Armstrong et al. |
| 6,289,462 | B1 | 9/2001 | McNabb et al. |
| 6,356,915 | B1 | 3/2002 | Chtchetkine et al. |
| 6,438,594 | B1 | 8/2002 | Bowman-Amuah |
| 6,557,168 | B1 | 4/2003 | Czajkowski |
| 6,633,963 | B1 | 10/2003 | Ellison et al. |
| 6,681,238 | B1 | 1/2004 | Brice et al. |
| 6,681,258 | B1 | 1/2004 | Ratcliff et al. |
| 6,701,460 | B1 | 3/2004 | Suwandi et al. |
| 6,725,457 | B1 | 4/2004 | Priem et al. |
| 6,738,832 | B2 | 5/2004 | Burr et al. |
| 6,792,514 | B2 | 9/2004 | Kapoor et al. |
| 6,813,766 | B2 | 11/2004 | Hay |
| 6,859,926 | B1 | 2/2005 | Brenner et al. |
| 6,938,169 | B1 | 8/2005 | Caronni et al. |
| 6,944,699 | B1 | 9/2005 | Bugnion et al. |
| 6,957,435 | B2 | 10/2005 | Armstrong et al. |
| 6,961,941 | B1 | 11/2005 | Nelson et al. |
| 6,993,762 | B1 | 1/2006 | Pierre |
| 7,027,463 | B2 | 4/2006 | Mathew et al. |
| 7,051,340 | B2 | 5/2006 | Fisher et al. |
| 7,076,633 | B2 | 7/2006 | Tormasov et al. |
| 7,076,634 | B2 | 7/2006 | Lambeth et al. |
| 7,095,738 | B1 | 8/2006 | Desanti |
| 7,096,469 | B1 | 8/2006 | Kubala et al. |
| 7,099,948 | B2 | 8/2006 | Tormasov et al. |
| 7,103,745 | B2 | 9/2006 | Koning et al. |
| 7,188,120 | B1 | 3/2007 | Leonard et al. |
| 7,194,439 | B2 * | 3/2007 | Kassan et al. .................. 705/51 |
| 7,363,495 | B2 | 4/2008 | Felt et al. |
| 7,461,144 | B1 | 12/2008 | Beloussov et al. |
| 2002/0069369 | A1 | 6/2002 | Tremain |
| 2002/0083367 | A1 | 6/2002 | McBride et al. |
| 2002/0120660 | A1 | 8/2002 | Hay et al. |
| 2002/0156824 | A1 | 10/2002 | Armstrong et al. |
| 2002/0161817 | A1 | 10/2002 | Dorofeev et al. |
| 2002/0173984 | A1 | 11/2002 | Robertson et al. |
| 2002/0174215 | A1 | 11/2002 | Schaefer |
| 2003/0014466 | A1 | 1/2003 | Berger et al. |
| 2003/0037092 | A1 | 2/2003 | McCarthy et al. |
| 2003/0069939 | A1 | 4/2003 | Russell |
| 2004/0010624 | A1 | 1/2004 | Garofalo et al. |
| 2004/0162914 | A1 | 8/2004 | St. Pierre et al. |
| 2004/0210760 | A1 | 10/2004 | McGrath et al. |
| 2004/0215848 | A1 | 10/2004 | Craddock et al. |
| 2005/0021788 | A1 | 1/2005 | Tucker et al. |
| 2005/0076326 | A1 * | 4/2005 | McMillan et al. ........... 717/100 |

OTHER PUBLICATIONS

Mc Dougall, Richard, et al., "Resource Management", Prentice Hall, 1999, 25 pages.

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1&nodoc=0, (2 pgs).

SunSoft, a Sun Microsystems, Inc. Business entitled "File System Administration", © 1994 Sun Microsystems, Inc., (62 pgs).

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

Czajkowski, G., "Application isolation in the Java Virtual Machine", 2000, ACM Press, Proceedings of the $15^{th}$ ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the $16^{th}$ ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

Official Action from EPO for foreign patent application No. 04 252 690.5-2211 dated Nov. 23, 2005 (5 pgs)—attached.

Current Claims in EPO patent application No. 04 252 690.5-2211 (9 pgs)—attached, Filed Sep. 29, 2005.

European Patent Office, "Communication pursuant to Article 94(3) EPC", Foreign application No. 04 252 690.5-2211, received Jun. 17, 2008, 5 pages.

Current Claims, Foreign application No. 04 252 690.5-2211, 9 pages, Filed Sep. 29, 2005.

Official Action from EPO for foreign patent application No. 04 252 690.5-2211 dated Jun. 10, 2005 (6 pgs)—attached.

Current Claims in EPO patent application No. 04 252 690.5-2211 (9 pgs)—attached, filed 2005.

European Patent Office, "European Search Report," application No. 04252689.7, mailing date Jul. 28, 2005, 3 pages.

Current Claims, European patent application 04252689.7, 6 pages, Filed 2005.

Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

European Patent Office, "Result of Consultation", Application No. 04252689.7-1243, dated Aug. 11, 2008, 2 pages.

Claims, Application No. 04252689.7-1243, 6 pages, Filed 2005.

European Search Report from the European Patent Office for Foreign Patent Application No. 04252690.5 (3 pgs.), Aug. 31, 2004.

Claims As Filed in European Patent Application No. 04252690.5 (6 pgs.), 2004.

U.S. Application/Pat. No. 15437-0601, filed Feb. 3, 2004, Office Action, mailed Apr. 29, 2008.
U.S. Appl. No. 10/763,147, filed Jan. 21, 2004, Notice Of Allowance, mailed Jun. 16, 2008.
U.S. Appl. No. 10/744,360, filed Dec. 22, 2003, Notice Of Allowance, Jul. 1, 2008.
U.S. Appl. No. 10/833,474, filed Apr. 27, 2004.
U.S. Appl. No. 10/767,118, filed Jan. 28, 2004.
U.S. Appl. No. 10/767,117, filed Jan. 28, 2004.
U.S. Appl. No. 10/766,094, filed Jan. 27, 2004.
U.S. Appl. No. 10/744,360, filed Dec. 22, 2003.
U.S. Appl. No. 10/763,147, filed Jan. 21, 2004.
U.S. Appl. No. 10/769,415, filed Jan. 30, 2004.
U.S. Appl. No. 10/761,622, filed Jan. 20, 2004.
U.S. Appl. No. 10/767,003, filed Jan. 28, 2004.
U.S. Appl. No. 10/762,066, filed Jan. 20, 2004.
U.S. Appl. No. 10/767,235, filed Jan. 28, 2004.
U.S. Appl. No. 10/771,827, filed Feb. 3, 2004.
U.S. Appl. No. 10/771,698, filed Feb. 3, 2004.
U.S. Appl. No. 10/768,303, filed Jan. 29, 2004.

* cited by examiner

SYSTEM ACCOUNTING FOR OPERATING SYSTEM PARTITIONS

CLAIM OF PRIORITY

This application claims priority to U.S. Provisional Application Ser. No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. The owners of these systems often could benefit by increasing the utilization of these systems' computing resources.

A number of approaches could be adopted in order to increase utilization. Under a "consolidation" approach, the processes and data of multiple parties might be co-located on a single hardware unit in order to more fully utilize the resources of the hardware unit. Under the consolidation approach, multiple parties might share a single hardware unit's resources, including file systems, network connections, and memory structures. For example, multiple businesses might have separate websites that are hosted by the same server.

However, some of the parties might not know or trust each other. In some cases, some of the parties actually might be competitors with others of the parties. Under such circumstances, each party would want to ensure that its processes and data are shielded, or isolated, from access by other parties and those other parties' processes.

Mechanisms that would isolate one party's processes and data from other parties sharing the same hardware unit have been proposed. For example, a "jail" mechanism provides the ability to partition an operating system environment into a "non jailed" environment and one or more "jailed" environments. The jail mechanism allows users, processes, and data to be associated with a jailed environment. For example, one group of users, processes, and data may be associated with one jailed environment, and another group of users, processes, and data may be associated with another jailed environment. The jail mechanism restricts users and processes that are associated with a particular jailed environment from accessing processes and data that are associated with environments (both jailed and non-jailed) other than the particular jailed environment.

Some operating system environments provide an accounting mechanism that records, for each process that executes in the environment, information about the length of time that the process executed, and the identity of the user that executed the process. When a process exits, the accounting mechanism adds, to a log file, accounting information that corresponds to the process. This accounting information may be used for billing purposes. The act of recording accounting information is called system accounting.

As discussed above, an operating system environment may be partitioned into a non-jailed environment and one or more jailed environments. However, no previous system accounting approaches contemplated multiple partitions within an operating system environment. Because previous system accounting approaches did not contemplate a partitioned operating system environment, previous system accounting approaches lack features that would be useful to an administrator of a partitioned operating system environment as well as administrators of the partitions of a partitioned operating system environment.

SUMMARY

In accordance with one embodiment of the present invention, a mechanism is disclosed for system accounting in an operating system environment that has been partitioned into a global zone and one or more non-global zones. Each zone has zero or more processes executing therein. These processes execute in association with that zone. Each zone contains a separate system accounting log file. When a process terminates, the process invokes an exit function implemented by a kernel that controls all of the zones. In response, the kernel determines in which zone the process executed. The kernel adds, to the system accounting log file of the zone in which the process executed, a record that indicates accounting information for the process. Consequently, the system accounting mechanism is provided separately in all of the zones, while isolating the processes and data in each zone from the processes and data in each other non-global zone.

Furthermore, in one embodiment, when a process executing in a non-global zone calls the exit function, the kernel also responsively adds, to the system accounting log file of the global zone, a record that indicates accounting information for the process. This record may indicate, among other information, an identity of the zone in which the process executed.

DETAILED DESCRIPTION OF EMBODIMENT(S)

Overview

Figure 1:
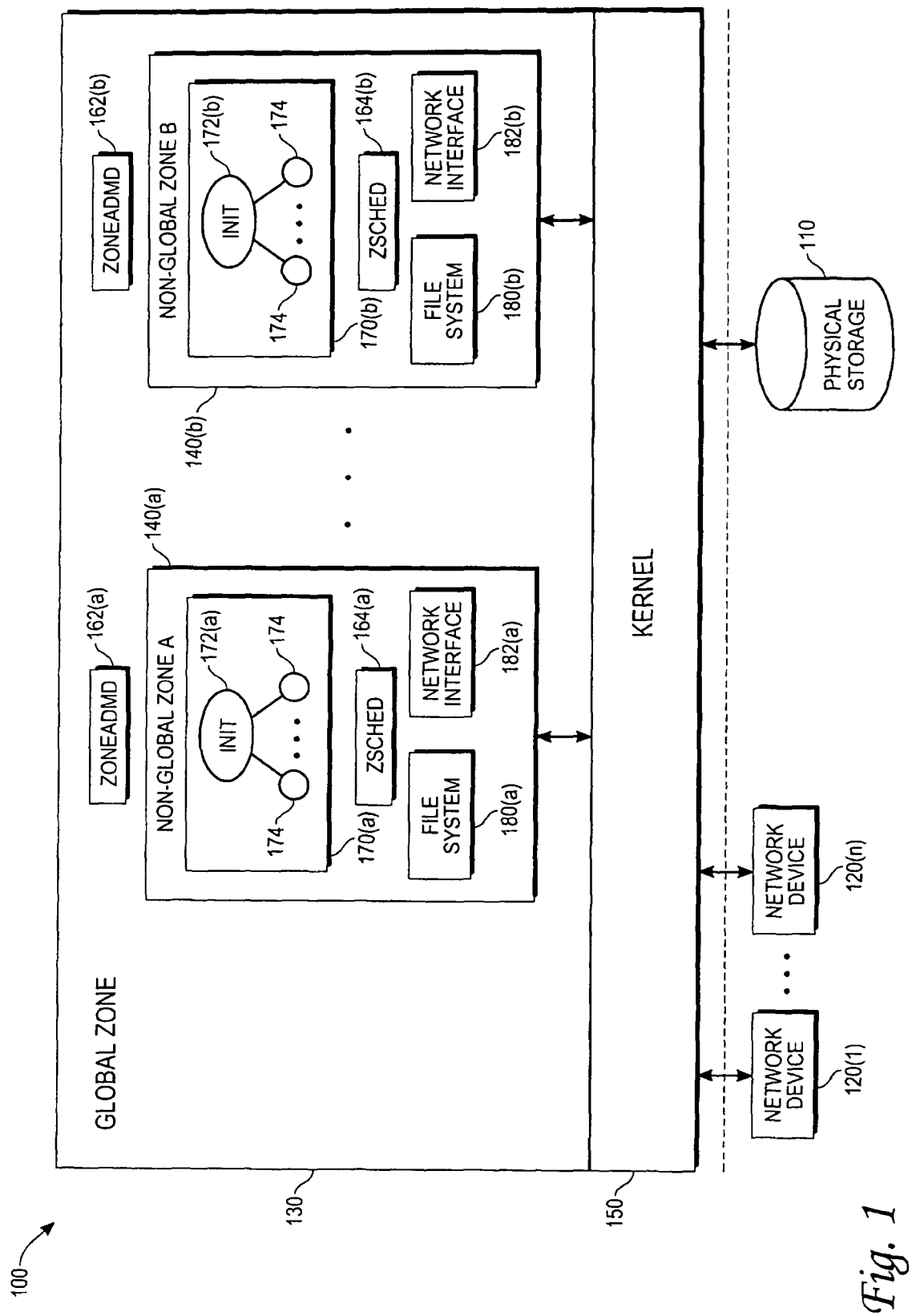
FIG. 1 is a functional block diagram of a representative operating system (OS) environment for a computing system in which one embodiment of the present invention may be implemented.
Figure 4:
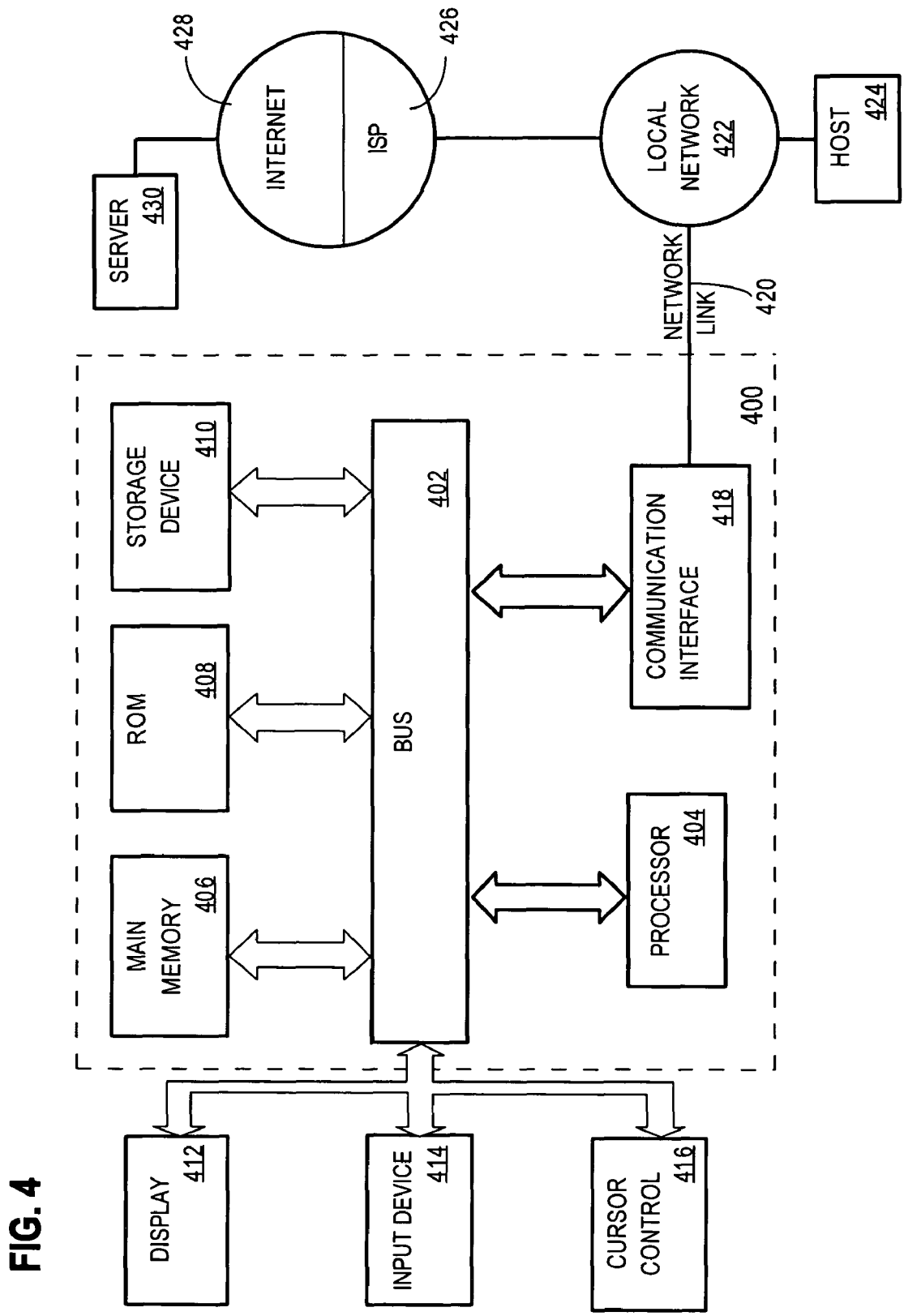
FIG. 4 is a hardware block diagram of a sample computer system, upon which one or more components of an embodiment of the present invention may be implemented.

FIG. 1 illustrates a functional block diagram of an operating system (OS) environment 100 in accordance with one embodiment of the present invention. OS environment 100 may be derived by executing an OS in a general-purpose computer system, such as computer system 400 illustrated in FIG. 4, for example. Although FIG. 4 depicts a system that contains centralized component resources, embodiments may be implemented on systems that comprise remotely distributed component resources (e.g., processors, memory, persistent storage, etc.) that access each other via a network. For illustrative purposes, the OS is assumed to be Solaris™ manufactured by Sun Microsystems, Inc. of Santa Clara, Calif. However, the concepts taught herein may be applied to any OS, including but not limited to Unix, Linux, Microsoft Windows, MacOS, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. Each of non-global zones 140 may be viewed as a virtual operating system environment ("VOSE"). One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors, then it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 generally are not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, kernel 150 enforces the zone boundaries. More specifically, kernel 150 ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are not limited to mapping the network interfaces 182 of the non-global zones 140 to the physical network devices 120 of the computer system, and mapping the file systems 180 of the non-global zones 140 to an overall file system and a physical storage 110 of the computer system.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. When a non-global zone 140 is in the Ready state, no user or non-kernel processes are executing inside the zone (as is mentioned above, zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Overview of Partitioned System Accounting

Figure 2:
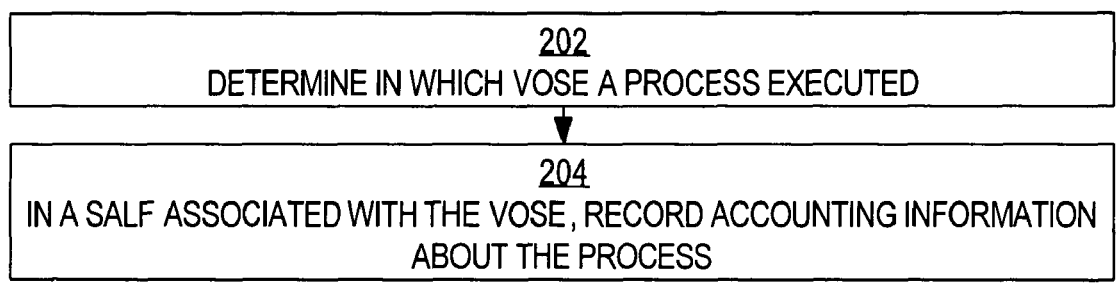
FIG. 2 depicts an overview of an operational flow for system accounting in an operating system environment that has been partitioned into a global zone and one or more non-global zones, in accordance with one embodiment of the present invention.

FIG. 2 depicts an overview of an operational flow for system accounting in an operating system environment that has been partitioned into a global zone and one or more non-global zones, in accordance with one embodiment of the present invention. In block 202, it is determined in which VOSE (i.e., non-global zone) of a plurality of VOSEs a process executed. In block 204, accounting information about the process is recorded in a system accounting log file ("SALF") that is stored in a file system partition that is associated with the VOSE in which the process executed. Thus, in one embodiment, a separate SALF is maintained for each zone, and each SALF contains accounting information pertaining to the processes that executed within the zone with which that SALF is associated.

Partitioned System Accounting Settings

In one embodiment, kernel 150 maintains separate accounting settings for each of non-global zones 140 and global zone 130. For example, kernel 150 may comprise first accounting settings that are associated with global zone 130, second accounting settings that are associated with non-global zone 140a, and third accounting settings that are associated with non-global zone 140b. The accounting settings for one zone may differ from accounting settings for other zones.

Additionally, each zone's file system may store a copy of a utility program that comprises code that, when executed, allows the accounting settings associated with that zone to be specified. For example, file system 180a may store a first copy of a utility program, file system 180b may store a second copy of the utility program, and the global zone's file system may store a third copy of the utility program. Thus, each zone's file system may store a copy of the same utility program.

In one embodiment, when the utility program is executed within a zone, a utility process is started as a child process of a process executing within that zone. Because each child process is associated with the zone with which that child process' parent process is associated, the utility process is associated with the zone in which it was executed. For example, if a zone administrator for non-global zone 140a executes the utility program, then, in non-global zone 140a, a utility process is started as a child process of a process executing in non-global zone 140a. Because the parent process of the utility process is associated with non-global zone 140a, the utility process is also associated with non-global zone 140a. Similarly, if a zone administrator for global zone 130 executes the utility program then, in global zone 130, a utility process will be started and associated with global zone 130.

Each zone is associated with a different zone identifier. Associating a process with a zone may be accomplished, for example, by storing an association between the process' unique process identifier and the zone's unique zone identifier.

In one embodiment, the code of the utility program includes an instruction to invoke a "systemcall" function implemented by kernel 150. The invocation of the systemcall function specifies the accounting settings that are to be associated with the zone from which the systemcall function was invoked. When a utility process executes the systemcall function, a module within kernel 150 (the "kernel module") determines the zone with which the utility process is associated (the "utility process' associated zone"). For example, if the utility process was executing within non-global zone 140a, then the kernel module determines that the utility process' associated zone is non-global zone 140a. The kernel module may make this determination, for example, by examining the zone identifier that is associated with the utility process' process identifier.

The kernel module receives the accounting settings specified by the invocation of the systemcall function and establishes an association between the accounting settings and the utility process' associated zone. The association is maintained within kernel 150.

Accounting settings for a zone may indicate the level of detail of information that should be recorded about events pertaining to the zone. For example, accounting settings may indicate whether the user identifier of a user that started a process should be recorded in an accounting log. For another example, accounting settings may indicate which of a plurality of statistics pertaining to a process should be recorded in an accounting log. In some OS environments, multiple processes may be associated with any one of a plurality of tasks, and multiple tasks may be associated with any one of a plurality of projects. Thus, accounting settings may indicate, for example, whether a process' associated task should be recorded in a system accounting log file, and whether a task's associated project should be recorded in a system accounting log file.

Different zone administrators may be interested in different aspects of information about events that pertain to those zones. By maintaining separate accounting settings for each zone, each zone administrator may specify the details in which he is interested without interfering with the preferences of any other zone administrator.

According to one embodiment, the utility program does not request or accept from a zone administrator any information that identifies the zone whose accounting settings are to be established. Thus, the partitioned nature of the OS environment may be kept transparent to zone administrators. Such transparency simplifies a zone administrator's tasks. Whenever a zone administrator specifies accounting settings, the kernel module automatically determines the zone to which the accounting settings pertain. Such transparency also eliminates any possibility of a zone administrator tinkering with the accounting settings for a zone with which he is not associated.

Partitioned System Accounting Log Files

In one embodiment, each zone is associated with a separate system accounting log file that is stored in that zone's file system. The kernel module maintains associations between zones and system accounting log files. For example, the kernel module may maintain an association between non-global zone 140a and a first system accounting log file that is stored in file system 180a. For another example, the kernel module may maintain an association between global zone 130 and a second system accounting log file that is stored in a file system of global zone 130.

When a process terminates normally, the process usually does so by calling an "exit" function implemented by kernel 150. When a process executes the exit function, the kernel module determines the zone with which the process is associated (the "process' associated zone"). The kernel module determines, from the accounting settings that are associated with the process' associated zone, which aspects of accounting information about the process should be stored in a system accounting log file for the process' associated zone.

In the system accounting log file that is associated with the process' associated zone, the kernel module adds a record that indicates accounting information about the process. According to one embodiment, the record indicates only those aspects of the accounting information that are specified by the accounting settings that are associated with the process' associated zone.

For example, the accounting settings associated with non-global zone 140a might indicate that accounting information aspects such as a process identifier, a user identifier, a process duration, a task identifier, and a project identifier are to be recorded. In that case, when a process executing within non-global zone 140a calls the exit function, the kernel module adds, to a system accounting log file stored in file system 180a, a record that indicates the process' identifier, the user identifier of the user that started the process, the length of time that the process executed, the task identifier of the task that is associated with the process, and the project identifier of the project that is associated with the task.

Additionally, when a process executes the exit function, the kernel module also determines, from the accounting settings that are associated with global zone 130, which aspects of accounting information about the process should be stored in a system accounting log file for global zone 130. The accounting settings that are associated with global zone 130 may indicate that, among other aspects of accounting information about the process, the zone identifier of the process' associated zone should be stored in the system accounting log file for global zone 130.

In the system accounting log file that is associated with global zone 130, the kernel module adds a record that indicates accounting information about the process. According to one embodiment, the record indicates only those aspects of the accounting information that are specified by the accounting settings that are associated with global zone 130.

For example, the accounting settings associated with global zone 130 might indicate that accounting information aspects such as a process identifier, a user identifier, process execution duration, and a zone identifier are to be recorded. In that case, when a process executing within non-global zone 140a calls the exit function, the kernel module adds, to a system accounting log file stored in a file system of global zone 130, a record that indicates the process' identifier, the user identifier of the user that started the process, the length of time that the process executed, and the zone identifier of the process' associated zone.

Thus, when a process executing in one of non-global zones 140 calls the exit function, the kernel module may generate multiple system accounting log file records in response. The kernel module may generate one record in the system accounting log file of the process' associated zone, and the kernel module may generate another record in the system accounting log file of the global zone. The aspects of the accounting information recorded in the non-global zone's system accounting log file may differ from the aspects of the accounting information recorded in the global zone's system accounting log file. For example, the global zone's system accounting log file might indicate the process' associated zone identifier, but the non-global zone's system accounting log file would not. Zone identifiers typically are interesting to global zone administrators, but not non-global zone administrators.

Because each non-global zone's file system is inaccessible from other non-global zones, information contained in each non-global zone's system accounting log file is protected from users who are associated with other non-global zones. Furthermore, because the portion of the global zone's file system that contains the global zone's system accounting log file is inaccessible from any non-global zones, the global zone's system accounting log file is protected from users who are not associated with the global zone.

Sample Operation

With the above information in mind, a sample of operation of the system 100 in accordance with one embodiment of the present invention will now be described. In the following discussion, reference will be made to the system diagram of FIG. 1 and the flow diagrams of FIGS. 3A-C.

Figure 3A:
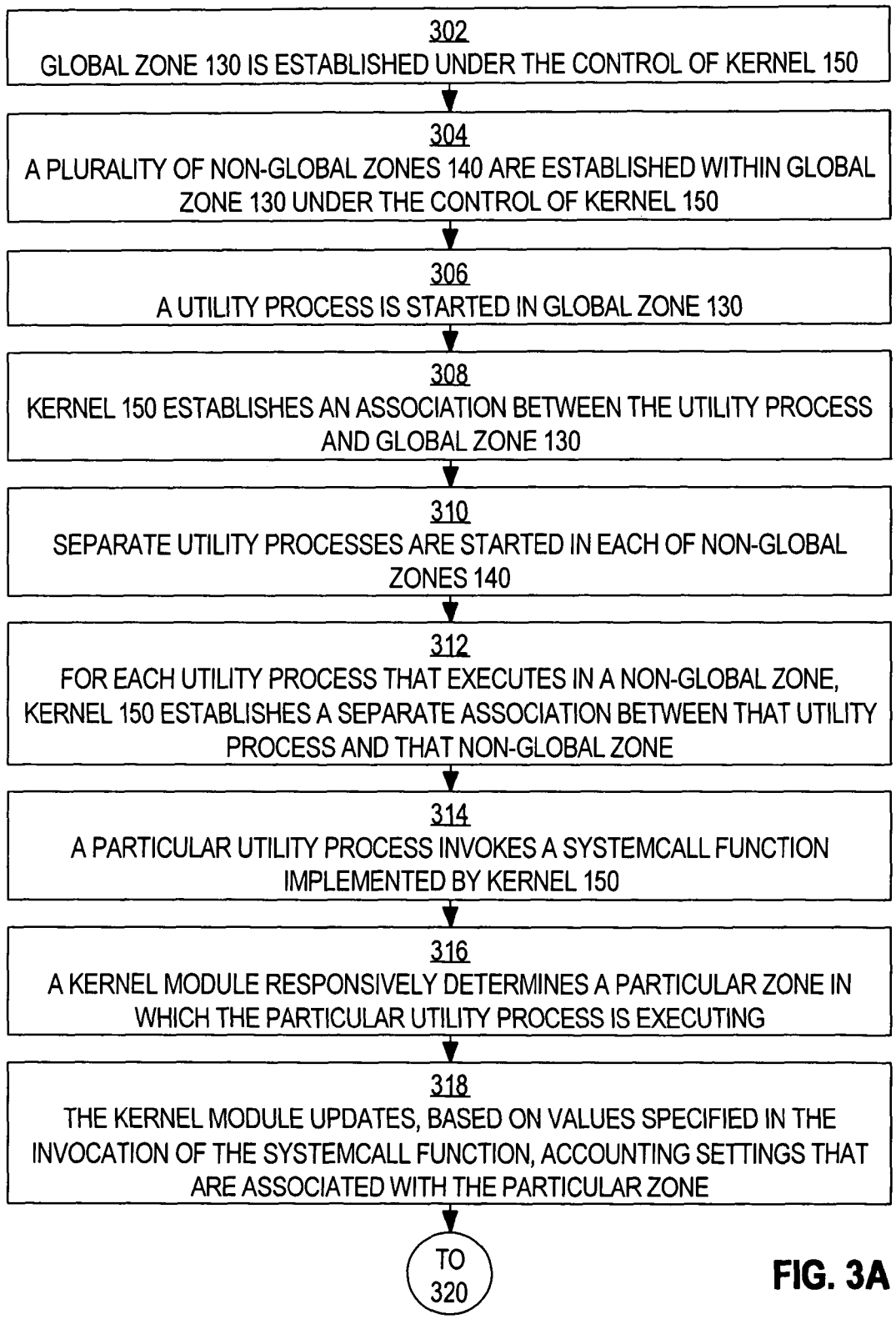
FIGS. 3A-C depict an operational flow for system accounting in an operating system environment that has been partitioned into a global zone and one or more non-global zones, in accordance with one embodiment of the present invention.
Figure 3B:
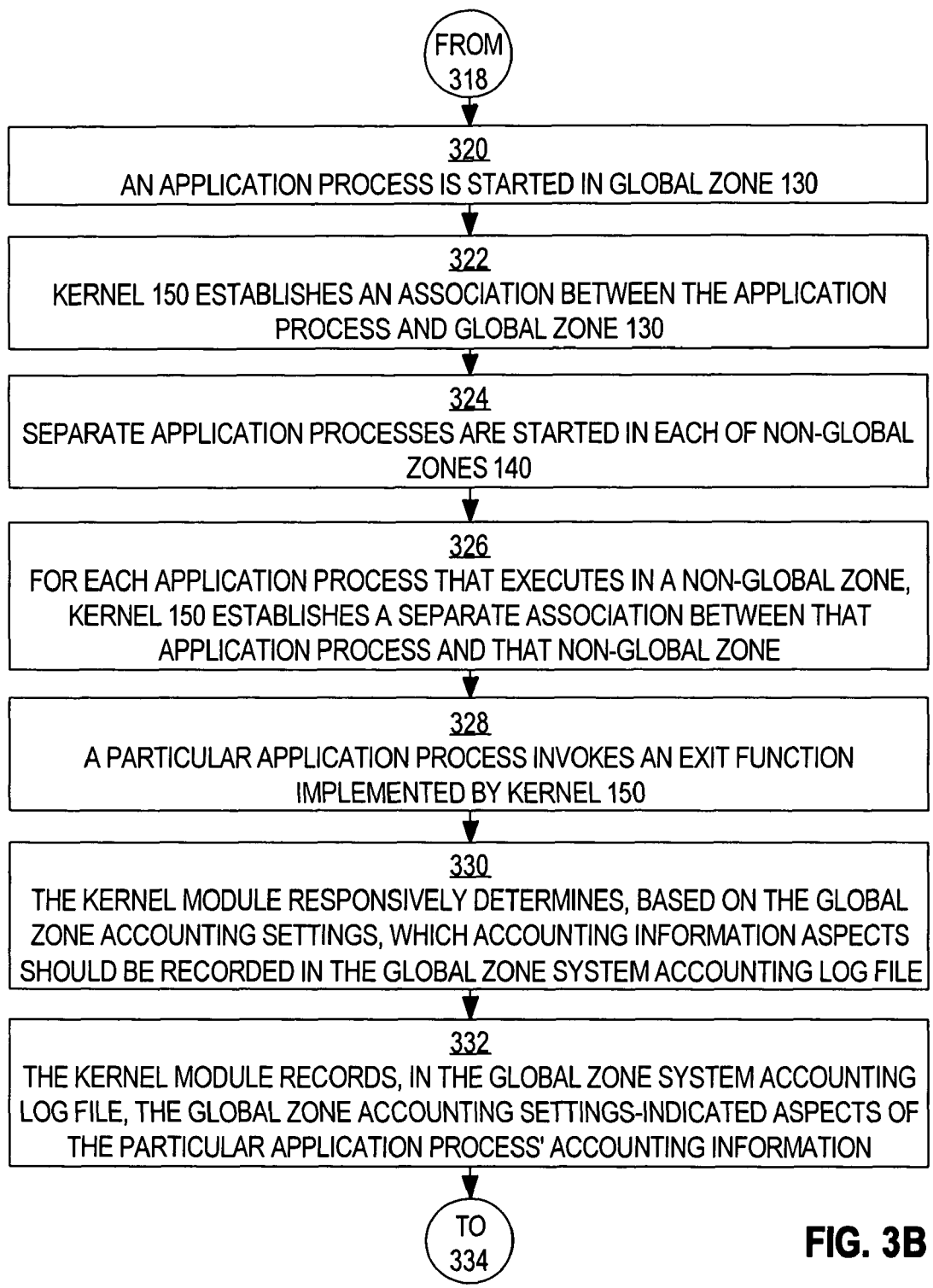
Figure 3C:
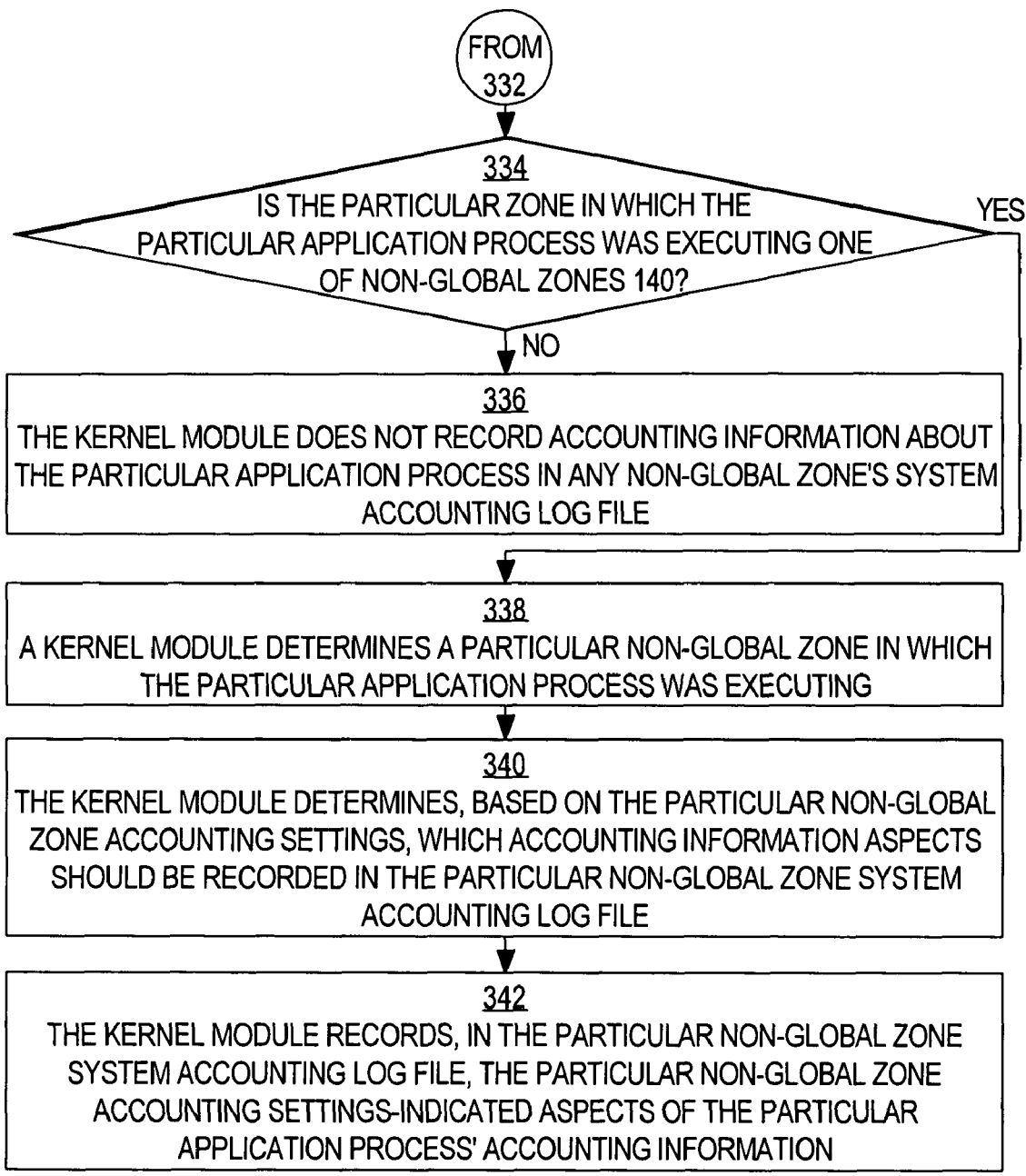

FIGS. 3A-C depict an operational flow for system accounting in an operating system environment that has been partitioned into a global zone and one or more non-global zones, in accordance with one embodiment of the present invention. In block 302, global zone 130 is established under the control of kernel 150. In block 304, a plurality of non-global zones 140, also under the control of kernel 150, are established within global zone 130.

In block 306, a utility process is started in global zone 130. In block 308, kernel 150 establishes an association between the utility process and global zone 130. In block 310, separate utility processes are started in each of non-global zones 140. In block 312, for each utility process that executes in a non-global zone, kernel 150 establishes a separate association between that utility process and the non-global zone in which that utility process executes.

In block 314, a particular utility process invokes a system-call function implemented by kernel 150. In block 316, a kernel module responsively determines, based on the associations between the utility processes and the zones, a particular zone in which the particular utility process is executing. In block 318, the kernel module updates, based on values specified in the invocation of the systemcall function, accounting settings that are associated with the particular zone. For example, if the kernel module determines that the particular utility process is executing within global zone 130, then the kernel module updates accounting settings that are associated with global zone 130. For another example, if the kernel module determines that the particular utility process is executing within non-global zone 140*a*, then the kernel module updates accounting settings that are associated with non-global zone 140*a*.

In block 320, an application process is started in global zone 130. In block 322, kernel 150 establishes an association between the application process and global zone 130. In block 324, separate application processes are started in each of non-global zones 140. In block 326, for each application process that executes in a non-global zone, kernel 150 establishes a separate association between that application process and the non-global zone in which that application process executes.

In block 328, a particular application process invokes an exit function implemented by kernel 150. In block 330, the kernel module responsively determines, based on the accounting settings associated with global zone 130 (the "global zone accounting settings"), which aspects of accounting information for the particular application process should be recorded in a system accounting log file that is stored in a file system of global zone 130 (the "global zone system accounting log file"). In block 332, the kernel module records, in the global zone system accounting log file, the global zone accounting settings-indicated aspects of the particular application process' accounting information.

For example, if the global zone accounting settings indicate that a user identifier, a process identifier, and a zone identifier are to be recorded for each exiting process, then the kernel module records, in the global zone system accounting log file, the user identifier of the user that started the particular application process, the process identifier of the particular application process, and the zone identifier of the zone in which the particular application process executed.

In block 334, the kernel module determines, based on the associations between the application processes and the zones, whether a particular zone in which the particular application process executed is one of non-global zones 140. If the particular zone is one or non-global zones 140, then control passes to block 338. Alternatively, if the particular zone is global zone 130, then control passes to block 336.

In block 336, the kernel module does not record accounting information about the particular application process in any system accounting log file that is stored in any of file systems 180 of non-global zones 140.

Alternatively, in block 338, the kernel module determines, based on the associations between the application processes and the zones, the particular non-global zone in which the particular application process executed. In block 340, the kernel module determines, based on the accounting settings associated with the particular non-global zone (the "particular non-global zone accounting settings"), which aspects of accounting information for the particular application process should be recorded in a system accounting log file that is stored in a file system of the particular non-global zone (the "particular non-global system zone accounting log file").

In block 342, the kernel module records, in the particular non-global zone system accounting log file, the particular non-global zone accounting settings-indicated aspects of the particular application process' accounting information.

For example, if the particular non-global zone is non-global zone 140*a*, and the accounting settings associated with non-global zone 140*a* indicate that system accounting log file records are to include a process identifier, a user identifier, a process duration, a task identifier, and a project identifier, then the kernel module records, in the system accounting log file stored in file system 180*a*, the particular application process' identifier, a user identifier of the user that started the particular application process, a length of time that the particular application process executed, a task identifier of a task that is associated with the particular application process, and a project identifier of a project that is associated with the task.

For another example, if the particular non-global zone is non-global zone 140*b*, and the accounting settings associated with non-global zone 140*b* indicate that system accounting log file records are to include a process identifier and a process duration, then the kernel module records, in the system accounting log file stored in file system 180*b*, the particular application process' identifier, and a length of time that the particular application process executed.

As a result, a zone administrator of global zone 130 may view system accounting information for all processes that executed in global zone 130 or any of non-global zones 140. Additionally, a zone administrator of one of non-global zones 140 may view system accounting information for processes that executed in the non-global zone that is associated with that zone administrator. Non-global zone administrators are insulated from system accounting information that relates to non-global zones that those non-global zone administrators do not administer.

Hardware Overview

In one embodiment, the various components of computing environment 100 shown in FIG. 1 can be implemented as sets of instructions executable by one or more processors. These components may be implemented as part of an operating system, including but not limited to the Solaris™ operating system produced by Sun Microsystems, Inc. FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   determining, by a processor, a first virtual operating system environment (VOSE) of a plurality of VOSEs in which a first process executed, in response to an ending of execution of the first process, wherein the plurality of VOSEs is controlled by a single operating system kernel instance;
   wherein each VOSE of the plurality of VOSEs comprises a file system partition of a global file system; and
   in response to the processor determining that the first process executed in the first VOSE, recording, in a first system accounting log file (SALF) stored in a first file system partition of the global file system associated with the first VOSE, first accounting information about the first process.

2. The method of claim 1, further comprising:
   in response to determining that the first process executed in the first VOSE, determining, based on first accounting settings that are associated with the first VOSE, one or more specified accounting information aspects of a plurality of accounting information aspects;
   wherein recording the first accounting information comprises recording aspects of accounting information that correspond to the one or more specified accounting information aspects.

3. The method of claim 2, further comprising:
   in response to an invocation of an accounting settings updating function by a second process that is executing in the first VOSE, determining in which VOSE of the plurality of VOSEs the second process is executing; and
   in response to determining that the second process is executing in the first VOSE, updating the first accounting settings;
   wherein the accounting settings updating function is implemented by the operating system kernel instance.

4. The method of claim 3, wherein processes that do not execute in the first VOSE are prevented from updating the first accounting settings.

5. The method of claim 1, wherein the first SALF is not accessible by any processes that execute in any VOSE other than the first VOSE.

6. The method of claim 1, further comprising:
   in response to an ending of execution of a second process that executed in a second VOSE of the plurality of VOSEs, determining in which VOSE of the plurality of VOSEs the second process executed; and
   in response to determining that the second process executed in the second VOSE, recording, in a second SALF stored in a second file system partition associated with the second VOSE, second accounting information about the second process;
   wherein the first VOSE is separate from the second VOSE.

7. The method of claim 6, further comprising:
   in response to determining that the first process executed in the first VOSE, determining, based on first accounting settings that are associated with the first VOSE, one or more first specified accounting information aspects of a plurality of accounting information aspects; and
   in response to determining that the second process executed in the second VOSE, determining, based on second accounting settings that are associated with the second VOSE, one or more second specified accounting information aspects of the plurality of accounting information aspects;
   wherein recording the first accounting information comprises recording aspects of accounting information that correspond to the one or more first specified accounting information aspects;
   wherein recording the second accounting information comprises recording aspects of accounting information that correspond to the one or more second specified accounting information aspects; and
   wherein the one or more first specified accounting information aspects are separate from the one or more second specified accounting information aspects.

8. The method of claim 7, further comprising:
   in response to an invocation of an accounting settings updating function by a third process that is executing in the first VOSE, determining in which VOSE of the plurality of VOSEs the third process is executing;
   in response to determining that the third process is executing in the first VOSE, updating the first accounting settings;
   in response to an invocation of the accounting settings updating function by a fourth process that is executing in the second VOSE, determining in which VOSE of the plurality of VOSEs the fourth process is executing; and
   in response to determining that the fourth process is executing in the second VOSE, updating the second accounting settings;
   wherein the accounting settings updating function is implemented by the operating system kernel instance; and
   wherein the first accounting settings are separate from the second accounting settings.

9. The method of claim 1, further comprising:
   in response to the ending of execution of the first process, recording, in a second SALF stored in a file system that is associated with a global operating system environment (OSE) that comprises the plurality of VOSEs, second accounting information about the first process;
   wherein the second SALF is separate from the first SALF.

10. The method of claim 9, further comprising:
    in response to determining that the first process executed in the first VOSE, determining, based on first accounting settings that are associated with the first VOSE, one or more first specified accounting information aspects of a plurality of accounting information aspects; and
    determining, based on second accounting settings that are associated with the global OSE, one or more second specified accounting information aspects of the plurality of accounting information aspects;
    wherein recording the first accounting information comprises recording aspects of accounting information that correspond to the one or more first specified accounting information aspects;
    wherein recording the second accounting information comprises recording aspects of accounting information that correspond to the one or more second specified accounting information aspects;

wherein the one or more first specified accounting information aspects are separate from the one or more second specified accounting information aspects;

in response to an invocation of an accounting settings updating function by a second process that is executing in the first VOSE, determining in which of the global OSE and the plurality of VOSEs the second process is executing;

in response to determining that the second process is executing in the first VOSE, updating the first accounting settings;

in response to an invocation of the accounting settings updating function by a third process that is executing in the global OSE, determining in which of the global OSE and the plurality of VOSEs the third process is executing; and in response to determining that the third process is executing in the global OSE, updating the second accounting settings;

wherein the first accounting settings are separate from the second accounting settings; and wherein the accounting settings updating function is implemented by the operating system kernel instance.

11. The method of claim 9, wherein the second accounting information indicates an identity of a VOSE in which the first process executed.

12. A volatile or non-volatile machine-readable storage medium, comprising:

instructions for causing one or more processors to determine a first virtual operating system environment (VOSE) of a plurality of VOSEs in which a first process executed, in response to an ending of execution of the first process, wherein the plurality of VOSEs is controlled by a single operating system kernel instance;

wherein each VOSE of the plurality of VOSEs comprises a file system partition of a global file system; and instructions for causing one or more processors to record, in response to determining that the first process executed in the first VOSE, in a first system accounting log file (SALF) stored in a first file system partition of the global file system associated with the first VOSE, first accounting information about the first process.

13. The volatile or non-volatile machine-readable storage medium of claim 12, further comprising:

instructions for causing one or more processors to determine, based on first accounting settings that are associated with the first VOSE, in response to determining that the first process executed in the first VOSE, one or more specified accounting information aspects of a plurality of accounting information aspects;

wherein the instructions for causing one or more processors to record the first accounting information comprise instructions for causing one or more processors to record aspects of accounting information that correspond to the one or more specified accounting information aspects.

14. The volatile or non-volatile machine-readable storage medium of claim 13, further comprising:

instructions for causing one or more processors to determine, in response to an invocation of an accounting settings updating function by a second process that is executing in the first VOSE, in which VOSE of the plurality of VOSEs the second process is executing; and instructions for causing one or more processors to update, in response to determining that the second process is executing in the first VOSE, the first accounting settings;

wherein the accounting settings updating function is implemented by the operating system kernel instance.

15. The volatile or non-volatile machine-readable storage medium of claim 14, wherein processes that do not execute in the first VOSE are prevented from updating the first accounting settings.

16. The volatile or non-volatile machine-readable storage medium of claim 12, wherein the first SALF is not accessible by any processes that execute in any VOSE other than the first VOSE.

17. The volatile or non-volatile machine-readable storage medium of claim 12, further comprising:

instructions for causing one or more processors to determine, in response to an ending of execution of a second process that executed in a second VOSE of the plurality of VOSEs, in which VOSE of the plurality of VOSEs the second process executed; and instructions for causing one or more processors to record, in response to determining that the second process executed in the second VOSE, in a second SALF stored in a second file system partition associated with the second VOSE, second accounting information about the second process;

wherein the first VOSE is separate from the second VOSE.

18. The volatile or non-volatile machine-readable storage medium of claim 17, further comprising:

instructions for causing one or more processors to determine, based on first accounting settings that are associated with the first VOSE, in response to determining that the first process executed in the first VOSE, one or more first specified accounting information aspects of a plurality of accounting information aspects; and instructions for causing one or more processors to determine, based on second accounting settings that are associated with the second VOSE, in response to determining that the second process executed in the second VOSE, one or more second specified accounting information aspects of the plurality of accounting information aspects;

wherein the instructions for causing one or more processors to record the first accounting information comprise instructions for causing one or more processors to record aspects of accounting information that correspond to the one or more first specified accounting information aspects;

wherein the instructions for causing one or more processors to record the second accounting information comprise instructions for causing one or more processors to record aspects of accounting information that correspond to the one or more second specified accounting information aspects;

wherein the one or more first specified accounting information aspects are separate from the one or more second specified accounting information aspects;

instructions for causing one or more processors to determine, in response to an invocation of an accounting settings updating function by third process that is executing in the first VOSE, in which VOSE of the plurality of VOSEs the third process is executing;

instructions for causing one or more processors to update, in response to determining that the third process is executing in the first VOSE, the first accounting settings;

instructions for causing one or more processors to determine, in response to an invocation of the accounting settings updating function by a fourth process that is executing in the second VOSE, in which VOSE of the plurality of VOSEs the fourth process is executing; and instructions for causing one or more processors to update, in response to determining that the fourth process is executing in the second VOSE, the second accounting settings;

wherein the accounting settings updating function is implemented by the operating system kernel instance; and wherein the first accounting settings are separate from the second accounting settings.

19. The volatile or non-volatile machine-readable storage medium of claim 12, further comprising:

instructions for causing one or more processors to record, in response to the ending of execution of the first process, in a second SALF stored in a file system that is associated with a global operating system environment (OSE) that comprises the plurality of VOSEs, second accounting information about the first process;

wherein the second SALF is separate from the first SALF.

20. The volatile or non-volatile machine-readable storage medium of claim 19, further comprising:

instructions for causing one or more processors to determine, based on first accounting settings that are associated with the first VOSE, in response to determining that the first process executed in the first VOSE, one or more first specified accounting information aspects of a plurality of accounting information aspects; and instructions for causing one or more processors to determine, based on second accounting settings that are associated with the global OSE, one or more second specified accounting information aspects of the plurality of accounting information aspects;

wherein the instructions for causing one or more processors to record the first accounting information comprise instructions for causing one or more processors to record aspects of accounting information that correspond to the one or more first specified accounting information aspects;

wherein the instructions for causing one or more processors to record the second accounting information comprise instructions for causing one or more processors to record aspects of accounting information that correspond to the one or more second specified accounting information aspects; and wherein the one or more first specified accounting information aspects are separate from the one or more second specified accounting information aspects.

21. The volatile or non-volatile machine-readable storage medium of claim 20, further comprising:

instructions for causing one or more processors to determine, in response to an invocation of an accounting settings updating function by a second process that is executing in the first VOSE, in which of the global OSE and the plurality of VOSEs the second process is executing;

instructions for causing one or more processors to update, in response to determining that the second process is executing in the first VOSE, the first accounting settings;

instructions for causing one or more processors to determine, in response to an invocation of the accounting settings updating function by a third process that is executing in the global OSE, in which of the global OSE and the plurality of VOSEs the third process is executing; and instructions for causing one or more processors to update, in response to determining that the third process is executing in the global OSE, the second accounting settings;

wherein the first accounting settings are separate from the second accounting settings; and wherein the accounting settings updating function is implemented by the operating system kernel instance.

22. The volatile or non-volatile machine-readable storage medium of claim 19, wherein the second accounting information indicates an identity of a VOSE in which the first process executed.

23. An apparatus, comprising:

a processor mechanism for determining a first virtual operating system environment (VOSE) of a plurality of VOSEs in which a first process executed, in response to an ending of execution of the first process, wherein the plurality of VOSEs is controlled by a single operating system kernel instance;

wherein each VOSE of the plurality of VOSEs comprises a file system partition of a global file system; and a memory mechanism for recording, in response to determining that the first process executed in the first VOSE, in a first system accounting log file (SALF) stored in a first file system partition of the global file system associated with the first VOSE, first accounting information about the first process.

24. The apparatus of claim 23, further comprising:

a mechanism for determining, based on first accounting settings that are associated with the first VOSE, in response to determining that the first process executed in the first VOSE, one or more specified accounting information aspects of a plurality of accounting information aspects;

wherein the mechanism for recording the first accounting information comprises a mechanism for recording aspects of accounting information that correspond to the one or more specified accounting information aspects.

25. The apparatus of claim 24, further comprising:

a mechanism for determining, in response to an invocation of an accounting settings updating function by a second process that is executing in the first VOSE, in which VOSE of the plurality of VOSEs the second process is executing; and a mechanism for updating, in response to determining that the second process is executing in the first VOSE, the first accounting settings;

wherein the accounting settings updating function is implemented by the operating system kernel instance.

26. The apparatus of claim 25, wherein processes that do not execute in the first VOSE are prevented from updating the first accounting settings.

27. The apparatus of claim 23, wherein the first SALF is not accessible by any processes that execute in any VOSE other than the first VOSE.

28. The apparatus of claim 23, further comprising:

a mechanism for determining, in response to an ending of execution of a second process that executed in a second VOSE of the plurality of VOSEs, in which VOSE of the plurality of VOSEs the second process executed; and a mechanism for recording, in response to determining that the second process executed in the second VOSE, in a second SALF stored in a second file system partition associated with the second VOSE, second accounting information about the second process;

wherein the first VOSE is separate from the second VOSE.

29. The apparatus of claim 28, further comprising:

a mechanism for determining, based on first accounting settings that are associated with the first VOSE, in response to determining that the first process executed in the first VOSE, determining one or more first specified accounting information aspects of a plurality of accounting information aspects; and
a mechanism for determining, based on second accounting settings that are associated with the second VOSE, in response to determining that the second process executed in the second VOSE, one or more second specified accounting information aspects of the plurality of accounting information aspects;
wherein the mechanism for recording the first accounting information comprises a mechanism for recording aspects of accounting information that correspond to the one or more first specified accounting information aspects;
wherein the mechanism for recording the second accounting information comprises a mechanism for recording aspects of accounting information that correspond to the one or more second specified accounting information aspects; and
wherein the one or more first specified accounting information aspects are separate from the one or more second specified accounting information aspects.

30. The apparatus of claim 29, further comprising:
a mechanism for determining, in response to an invocation of an accounting settings updating function by a third process that is executing in the first VOSE, in which VOSE of the plurality of VOSEs the third process is executing;
a mechanism for updating, in response to determining that the third process is executing in the first VOSE, the first accounting settings;
a mechanism for determining, in response to an invocation of the accounting settings updating function by a fourth process that is executing in the second VOSE, in which VOSE of the plurality of VOSEs the fourth process is executing; and
a mechanism for updating, in response to determining that the fourth process is executing in the second VOSE, the second accounting settings;
wherein the accounting settings updating function is implemented by the operating system kernel instance; and
wherein the first accounting settings are separate from the second accounting settings.

31. The apparatus of claim 23, further comprising:
a mechanism for recording, in response to the ending of execution of the first process, in a second SALF stored in a file system that is associated with a global operating system environment (OSE) that comprises the plurality of VOSEs, second accounting information about the first process;
wherein the second SALF is separate from the first SALF.

32. The apparatus of claim 21, further comprising:
a mechanism for determining, based on first accounting settings that are associated with the first VOSE, in response to determining that the first process executed in the first VOSE, one or more first specified accounting information aspects of a plurality of accounting information aspects; and
a mechanism for determining, based on second accounting settings that are associated with the global OSE, one or more second specified accounting information aspects of the plurality of accounting information aspects;
wherein the mechanism for recording the first accounting information comprises a mechanism for recording aspects of accounting information that correspond to the one or more first specified accounting information aspects;
wherein the mechanism for recording the second accounting information comprises a mechanism for recording aspects of accounting information that correspond to the one or more second specified accounting information aspects;
wherein the one or more first specified accounting information aspects are separate from the one or more second specified accounting information aspects;
a mechanism for updating, in response to an invocation of an accounting settings updating function by a second process that is executing in the first VOSE, In which of the global OSE and the plurality of VOSEs the second process is executing;
a mechanism for updating, in response to determining that the second process is executing in the first VOSE, the first accounting settings;
a mechanism for determining, in response to an invocation of the accounting settings updating function by a third process that is executing in the global OSE, In which of the global OSE and the plurality of VOSEs the third process is executing; and
a mechanism for updating, in response to determining that the third process is executing in the global OSE, the second accounting settings;
wherein the first accounting settings are separate from the second accounting settings; and
wherein the accounting settings updating function is implemented by the operating system kernel instance.

33. The apparatus of claim 31, wherein the second accounting information indicates an identity of a VOSE in which the first process executed.

34. The method of claim 1, wherein the operating system kernel instance exists in a global zone that contains the plurality of VOSEs, and wherein the operating system kernel instance determines in which VOSE of the plurality of VOSES the first process executed in response to the first process invoking an exit function of the operating system kernel instance.

35. The volatile or non-volatile machine-readable storage medium of claim 12, wherein the operating system kernel instance exists in a global zone that contains the plurality of VOSEs, and wherein the operating system kernel instance determines in which VOSE of the plurality of VOSES the first process executed in response to the first process invoking an exit function of the operating system kernel instance.

36. The apparatus of claim 23, wherein the operating system kernel instance exists in a global zone that contains the plurality of VOSEs, and wherein the operating system kernel instance determines in which VOSE of the plurality of VOSES the first process executed in response to the first process invoking an exit function of the operating system kernel instance.

* * * * *

UNITED STATES PATENT AND TRADEMARK OFFICE
CERTIFICATE OF CORRECTION

| | |
|---|---|
| PATENT NO. | : 7,793,289 B1 |
| APPLICATION NO. | : 10/762067 |
| DATED | : September 7, 2010 |
| INVENTOR(S) | : Ozgur C. Leonard et al. |

It is certified that error appears in the above-identified patent and that said Letters Patent is hereby corrected as shown below:

On the cover page, item (56) References Cited, line 7, the month/year reads "7/1995" should read -- 6/1995 --.

Claim 32, column 19, line 1, the word "claim 21" should read -- claim 31 --.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,793,289 B1 | Page 1 of 1 |
| APPLICATION NO. | : 10/762067 | |
| DATED | : September 7, 2010 | |
| INVENTOR(S) | : Ozgur C. Leonard et al. | |

It is certified that error appears in the above-identified patent and that said Letters Patent is hereby corrected as shown below:

On the cover page, item (56) References Cited, line 7, the month/year reads "7/1995" should read -- 6/1995 --.

Column 19, line 52 (Claim 32, line 1) the word "claim 21" should read -- claim 31 --.

This certificate supersedes the Certificate of Correction issued October 26, 2010.

Signed and Sealed this

Twenty-third Day of November, 2010

David J. Kappos
*Director of the United States Patent and Trademark Office*